United States Patent
Scotti Del Greco et al.

(10) Patent No.: US 8,567,184 B2
(45) Date of Patent: Oct. 29, 2013

(54) ENERGY RECOVERY SYSTEM IN A GAS COMPRESSION PLANT

(75) Inventors: Alberto Scotti Del Greco, Florence (IT); Renato Ferroni, Florence (IT); Gabriele Mariotti, Lucca (IT); Alessandra Barabino, Genoa (IT)

(73) Assignee: Nuovo Pignone S.p.A., Florence (IT)

( * ) Notice: Subject to any disclaimer, the term of this patent is extended or adjusted under 35 U.S.C. 154(b) by 206 days.

(21) Appl. No.: 12/765,569

(22) Filed: Apr. 22, 2010

(65) Prior Publication Data
US 2010/0272588 A1   Oct. 28, 2010

(30) Foreign Application Priority Data
Apr. 28, 2009   (IT) ............... M12009A0724

(51) Int. Cl.
*F16D 31/02*   (2006.01)
(52) U.S. Cl.
USPC .............................. 60/409; 417/323; 417/408
(58) Field of Classification Search
USPC .............................. 417/408, 323; 60/353, 409
See application file for complete search history.

(56) References Cited

U.S. PATENT DOCUMENTS

| | | | |
|---|---|---|---|
| 2,322,338 A * | 6/1943 | Baumann | 417/323 |
| 3,495,766 A * | 2/1970 | Hinkle | 417/380 |
| 3,826,594 A * | 7/1974 | Hornschuch et al. | 417/245 |
| 4,215,550 A * | 8/1980 | Dinger et al. | 60/606 |
| 4,237,693 A * | 12/1980 | Maslen et al. | 60/648 |
| 4,342,201 A * | 8/1982 | Ishii | 62/238.4 |
| 4,586,870 A * | 5/1986 | Hohlweg et al. | 415/1 |
| 4,949,276 A * | 8/1990 | Staroselsky et al. | 700/282 |
| 5,195,875 A * | 3/1993 | Gaston | 417/282 |
| 6,360,535 B1 * | 3/2002 | Fisher | 60/409 |
| 7,269,956 B2 * | 9/2007 | Gericke et al. | 60/782 |
| 7,841,306 B2 * | 11/2010 | Myers et al. | 122/406.5 |

FOREIGN PATENT DOCUMENTS

| | | |
|---|---|---|
| FR | 830252 | 7/1938 |
| GB | 1343246 | 1/1974 |

* cited by examiner

*Primary Examiner* — Charles Freay
*Assistant Examiner* — Patrick Hamo
(74) *Attorney, Agent, or Firm* — Global Patent Operation (57) ABSTRACT

A system for recovering energy in a gas compression plant. The system comprises at least one centrifugal compressor configured to suck the gas, at a certain inlet pressure, from a suction conduit and configured to deliver the gas, at a certain outlet pressure that is greater than an inlet pressure, through a delivery conduit The system also includes at least one gas recirculation system configured to redirect the gas from the delivery conduit to the suction conduit when the gas flow rate entering into the compressor is below a certain limit value. In the portion of the plant arranged downstream of the compressor, at least one turbo-expander and at least one valve are installed in parallel so that they cooperate with each other and are controlled by electronic devices so as to protect the compressor and to produce useful energy during recirculation mode.

5 Claims, 6 Drawing Sheets

Fig. 1

PRIOR ART

ENERGY RECOVERY SYSTEM IN A GAS COMPRESSION PLANT

CROSS-REFERENCE TO RELATED APPLICATION

This application claims priority under 35 U.S.C. §119(a)-(d) or (f) to prior-filed, co-pending Italian application number MI2009A000724, filed on Apr. 28, 2009, which is hereby incorporated by reference in its entirety.

FIELD OF INVENTION

The present invention refers to an energy recovery system in a gas compression plant, in particular but not exclusively intended for operating on pipelines for conveying gas or hydrocarbons.

BACKGROUND OF THE INVENTION

As it is known, a compressor is a machine that is capable of raising the pressure of a compressible fluid (gas) through the use of mechanical energy. Amongst the various types of compressors used in process plants in the industrial field, there are so called centrifugal compressors, in which energy is provided to the gas in the form of centrifugal acceleration due to rotation, generally controlled by a driver (electric motor or steam turbine), of a member called centrifugal impeller or wheel.

Centrifugal compressors can be provided with a single impeller, in the so called single-stage configuration, or with many impellers arranged in series, in this case called multistage compressors. More precisely, each stage of a centrifugal compressor is normally made up of a suction conduit for the gas to be compressed, of an impeller, which is capable of providing kinetic energy to the gas, and of a diffuser, the task of which is that of converting the kinetic energy of the gas in outlet from the impeller into pressure energy.

In alternative types of compressors, on the other hand, fluid is compressed by one or more pistons which can move with alternate motion inside a respective cylinder. The fluid to be compressed is sucked into the cylinder through one or more suction conduits, whereas the compressed fluid is delivered from the cylinder towards one or more delivery conduits. Commonly, the piston or the pistons of an alternate compressor are actuated by electric motors or by internal combustion engines, through a crank shaft for transmitting the motion and a conventional rod-crank mechanism.

In gas compression plants, be they provided with one or more centrifugal or axial type compressors, so called anti-surge systems are often present, suitably designed and sized to allow the compressor to operate even if there is a very low gas flow rate. Indeed, as it is known, the flow rate of gas entering into a compressor must not drop below a certain limit value, otherwise, the compressor finds itself operating in surge conditions.

Surge is a phenomenon of instability in the gas flow that occurs when the compressor reaches the point in which the pressure-flow rate curve becomes flat. From such an operating condition, if the flow rate decreases further, the compressor is not capable of producing enough pressure to oppose the downstream resistance. More precisely, the delivery pressure of the compressor is lower than the pressure in the plant downstream of the compressor itself. This condition can cause the gas flow to be reversed through the compressor. This condition is particularly dangerous for the mechanical integrity of the machine, due to the vibrations and to the forces induced by the reversing of the flow rate. For this reason the antisurge system allows the recirculation of an amount of gas which is sufficiently high, so as to avoid that the machine operates in surge condition.

Antisurge systems can be provided with both closed loop recirculation pipes, with relative antisurge valves, as well as with relief valves placed in the portion of the plant downstream of the compressor. In compression plants provided with closed loop recirculation pipes, when the gas flow rate drops below the critical value which causes the surging phenomenon to occur, suitable valves send the gas back, through the recirculation pipes, from the delivery conduit to the suction conduit. The work provided by the compressor to the gas is thus dissipated inside the recirculation pipes, mainly through the antisurge valve, and the heat produced is normally eliminated by means of a cooling device. In other words, when a compressor is operating in recirculation conditions, the head (i.e. pressure increase) that such a compressor is capable of providing to the gas must be dissipated in the recirculation pipes. Normally, this occurs through the opening of the antisurge valve to reduce the gas pressure or, to use the jargon, to "laminate" the gas.

If the antisurge system recirculates the entire flow rate of the gas that passes through the compressor, the overall mechanical energy provided to the compressor by the relative actuation motor is converted into heat, the removal of which is helped by the cooling device present in the plant. The energy necessary for the compressor to operate in surge condition is thus lost, according to the percentage of recycled flow rate, since the heat given up by the gas in the recirculation pipes is normally difficult to recover.

Indeed, to this day, the only way to partially reduce the energy losses when the compressor operates in recirculation conditions is that of minimizing the quantity of recycled gas by acting upon the antisurge algorithm, i.e. by modifying the size of the recirculation pipes and of the relative antisurge valve, or by modifying the operating characteristic of the compressor by means of adjustment systems, like systems for varying the speed, mobile blades, etc. In any case, these systems, when they can be applied to plants for conveying gas or hydrocarbons, do not allow the operative minimum flow rate to be reduced at will.

The general purpose of the present invention is therefore that of making an energy recovery system in a gas compression plant that is capable of overcoming the aforementioned problems of the prior art.

In particular, a purpose of the present invention is that of making an energy recovery system in a gas compression plant capable of transforming, at least partially, the losses of energy that occur when the compressor or the compressors of the plant operate in gas recirculation conditions into useful work.

Another purpose of the invention is that of making an energy recovery system in a gas compression plant capable of improving the overall performance of the plant itself, at the same time keeping the consumption of fuel and heat emission low, all to the benefit of reduction of the greenhouse effect.

These and other purposes according to the present invention are achieved by making an energy recovery system in a gas compression plant as outlined in claim 1.

Further characteristics of the invention are highlighted in the dependent claims, which are an integral part of the present description.

BRIEF DESCRIPTION OF THE DRAWINGS

The characteristics and the advantages of an energy recovery system in a gas compression plant according to the present invention shall become clearer from the following description, given as an example and not for limiting purposes, with reference to the attached schematic drawings, in which.

It should be noted that in each figure, same numbers correspond to the same systems or components of the previous and/or following figures.

DETAILED DESCRIPTION OF THE INVENTION

Figure 1:
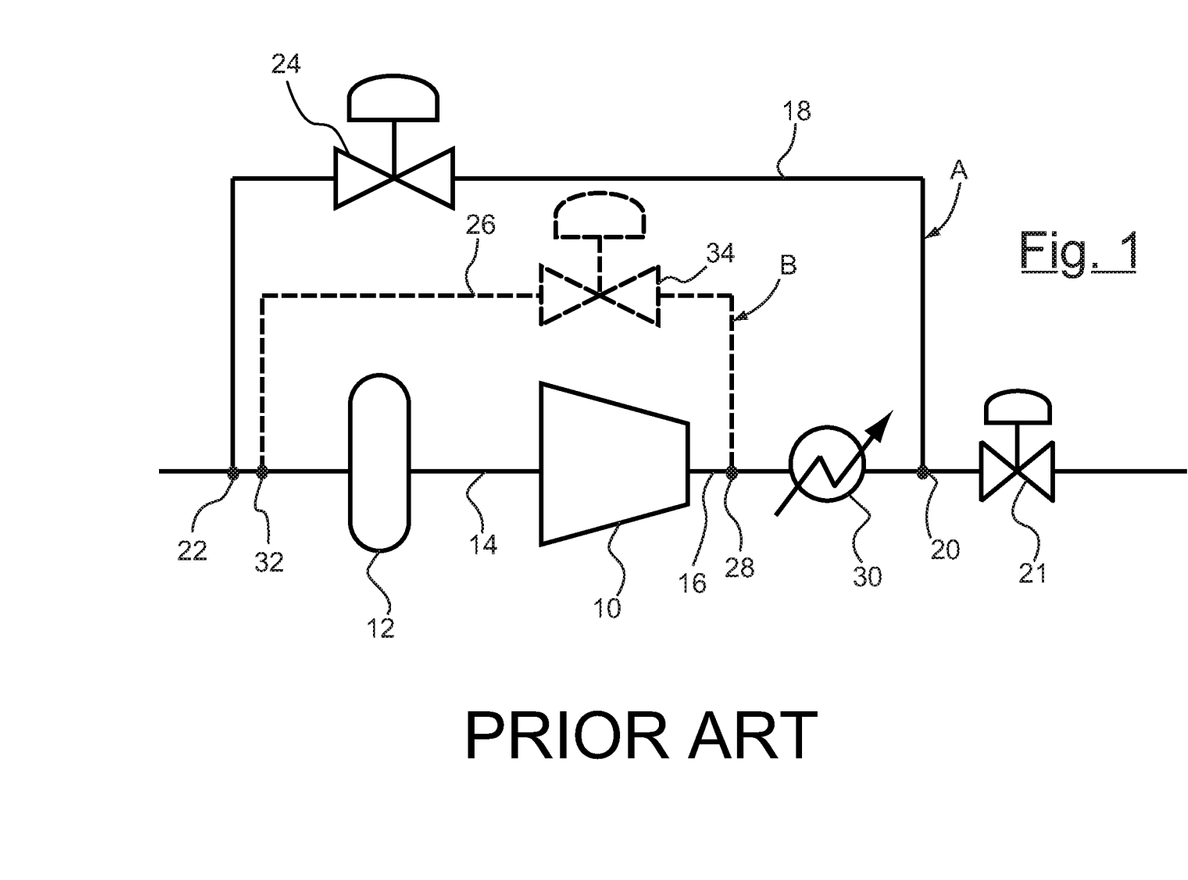
FIG. 1 is a completely schematic view of a gas compression plant made according to the prior art.

With reference in particular to FIG. 1, a generic gas compression plant according to the prior art is schematically shown, in particular for pipelines for conveying gas or hydrocarbons and of the type designed to operate frequently in the gas recirculation mode.

The plant of FIG. 1 comprises at least one compressor 10, generally of the centrifugal type, controlled by a suitable motor or driver 12. The compressor 10 is thus capable of sucking the gas, at a certain inlet pressure, from a suction conduit 14 and of delivering it, at a certain outlet pressure that is greater than that of the inlet pressure, through a delivery conduit 16. Along the delivery conduit 16 it can be foreseen for there to be a cooling device 30 the function of which is that of lowering the gas temperature in outlet, when necessary.

If the gas pressure in the delivery conduit 16, due to a particularly low flow rate of the gas itself entering into the compressor 10, is lower than the pressure in the plant downstream of such a delivery conduit 16, in the plant there will be at least one gas recirculation system capable of redirecting the gas from the delivery conduit 16, arranged directly downstream of the compressor 10, to the suction conduit 14, possibly after the gas outlet of the plant itself is closed, so as to avoid the occurrence of the so called surging instability phenomenon.

More precisely, as shown in FIG. 1, a first gas recirculation system A is schematized with a first recirculation pipe 18, having its inlet point 20 arranged on the delivery conduit 16 downstream of the cooling device 30. The first recirculation pipe 18 is thus capable of reintroducing the low pressure gas in outlet from the compressor 10 into the suction conduit 14, through an outlet point 22 arranged upstream of the motor 12.

On the first recirculation pipe 18 there is at least one antisurge valve 24 capable of carrying out the gas lamination or, in other words, of further reducing the pressure of the gas in transit through such a piping 18. The recirculation system A also comprises a first blow off valve 21 suitable for closing the outlet of the gas from the plant.

In the plant shown in FIG. 1 there is also a second gas recirculation system B (in a broken line in the figure), comprising a second recirculation pipe 26 having its inlet point 28 arranged on the delivery conduit 16 upstream of the cooling device 30. The second recirculation pipe 26 is thus capable of reintroducing the low pressure gas in outlet from the compressor 10 into the suction conduit 14, through an outlet point 32 arranged downstream of the outlet point 22 of the first recirculation pipe 18. Even the second recirculation pipe 26 is provided with at least one antisurge valve 34 capable of carrying out the gas lamination or, in other words, of further reducing the pressure of the gas in transit through such a piping 26.

It should be noted that the first gas recirculation system A can be foreseen in the plant without requiring there to be also the second recirculation system B.

Figure 2:
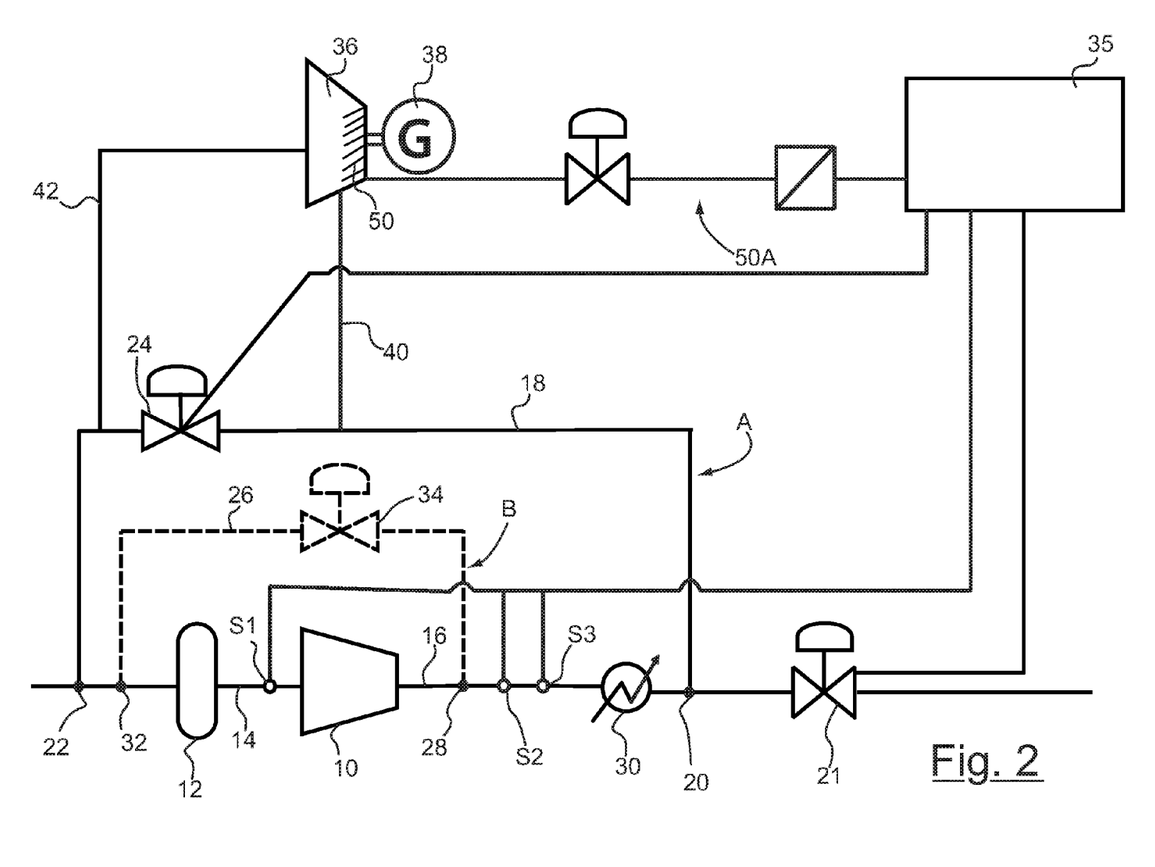
FIG. 2 is a completely schematic view of a gas compression plant provided with a first example embodiment of the energy recovery system according to the invention.

According to an embodiment of the invention, shown in FIG. 2, in the portion of the plant arranged downstream of the compressor 10, more precisely in the recirculation system A, a turbo-expander 36 is installed in parallel with respect to the antisurge valve 24 and provided with its own suction conduit 40 and with its own delivery conduit 42. Both the turbo-expander 36 and the antisurge valve 24 cooperate with each other and are controlled by electronic devices 35 suitable for activating the turbo-expander 36 and the valve 24 according to the flow rate of the gas and to the working conditions of the compressor 10. The turbo-expander 36 could also be installed in a different recirculation system, for example in system B, in a completely analogous way to that described above, according to particular construction or use requirements.

Therefore, in the case described, during normal operation of the plant, the valve 24 is closed and the recirculation circuit A is deactivated. During the recovery step, the first blow off valve 21 downstream of the plant closes the flow in outlet, whereas, the valve 24 opens the recirculation system A. As soon as the recirculation has been stabilized, such a valve 24 gradually closes to transfer the flow rate to the turbo-expander 36, as described in more detail hereafter. Therefore, in this case, the turbo-expander is actuated by the gas once this has been preventively cooled by the cooling device 30.

In particular, the electronic devices 35 are suitable for activating the recirculation system A (by opening the valve 24 and closing the valve 21) according to the fluid flow rate variation measured by means of suitable sensors S1, S2 and S3, arranged in suitable positions on the suction and delivery conduits 14 and 16 of the compressor 10, respectively. In this way it is possible to activate the recirculation system A when the compressor 10 gets closer to its own limit work conditions.

During the initial step of the recirculation mode, based upon pressure and flow rate values acquired by the sensors S1, S2 and S3, the valve 24 remains open for the necessary amount of time to stabilize the recirculation of gas based upon the operation of the compressor 10. As soon as the recirculation has been stabilized, the valve 24 gradually closes so as to transfer the head to the turbo-expander 36.

Figure 4:
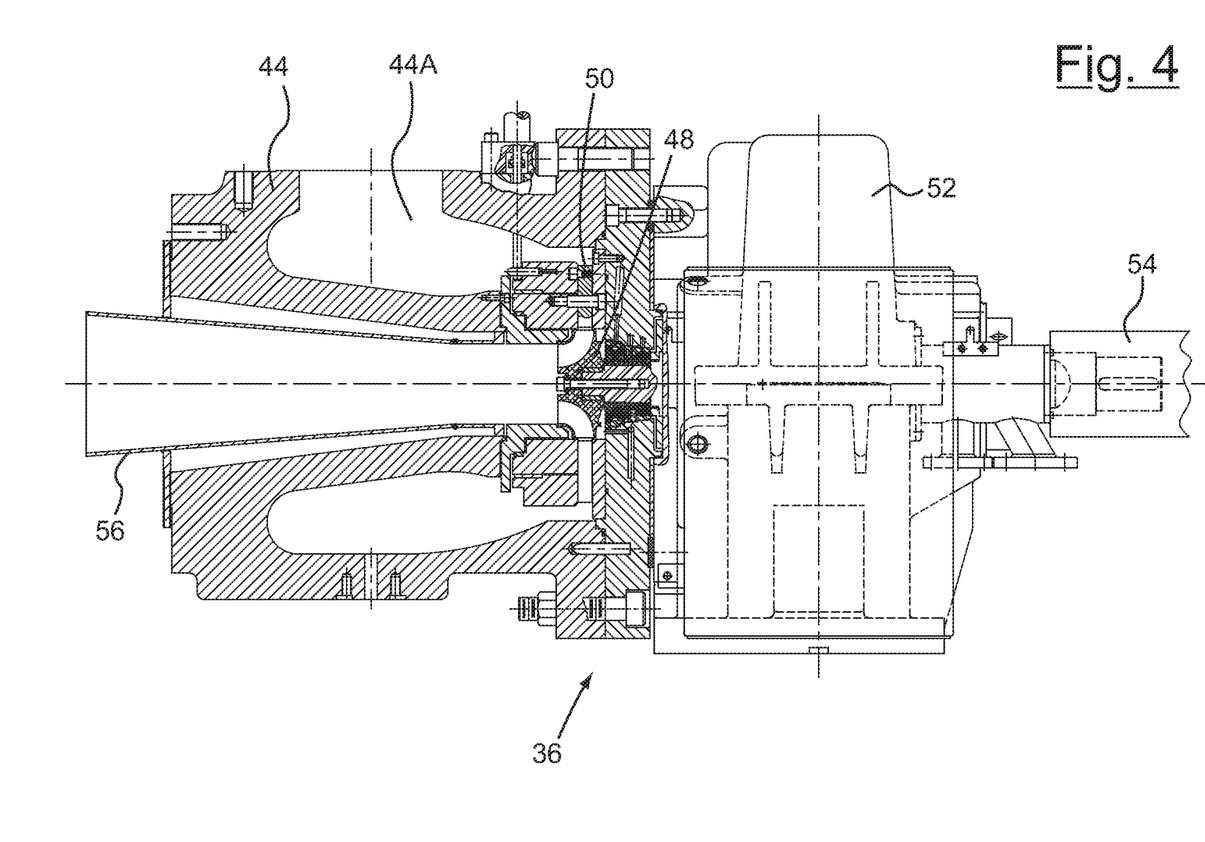
FIG. 4 is a schematic view in a vertical section of a component of the energy recovery system according to the invention.

At the same time, the electronic devices 35 gradually modify the inclination of adjustable inlet guide vanes 50, placed inside the turbo-expander 46, to optimize the gas flow rate into the turbo-expander 46 itself (see also the following description with reference to FIG. 4). The "inlet guide vanes" 50, or IGV, can be controlled by the electronic devices 35 by means of a hydro-pneumatic circuit, wholly indicated with reference numeral 50A in FIG. 2.

The mechanical pressure energy conferred to gas by the compressor 10, when operating in the recirculation mode, is thus at least partially recovered instead of being completely dispersed in the form of heat, since the gas itself is made to expand in the turbo-expander 36 capable of generating mechanical power.

The turbo-expander 36 can be mechanically coupled with an electric current generator 38, so as to allow mechanical energy produced by the turbo-expander 36 itself to be converted into electric energy. Such electric energy can be used for example to actuate machinery connected to the compression plant, or it can be directly emitted into the grid.

Figure 3:
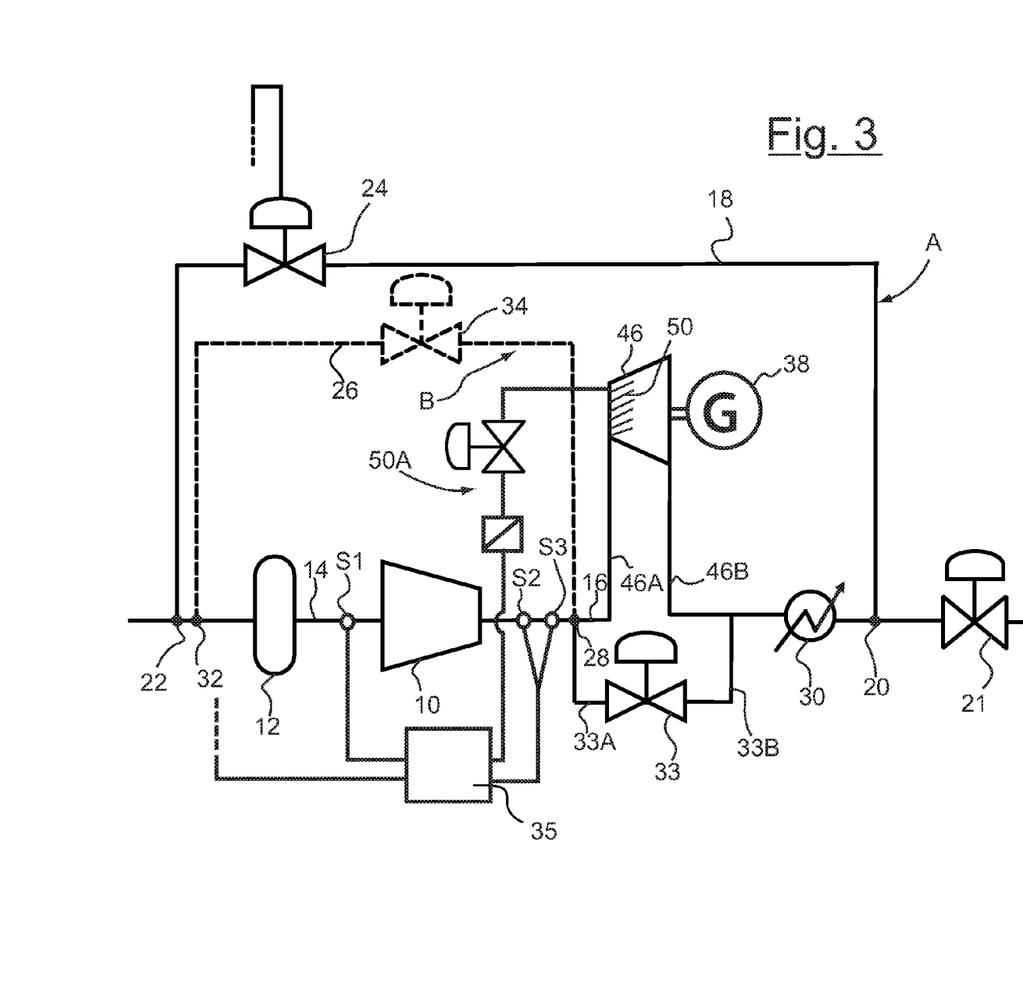
FIG. 3 is a completely schematic view of a gas compression plant provided with a second example embodiment of the energy recovery system according to the invention.

FIG. 3 shows the plant of FIG. 2 with a modified embodiment of the system according to the invention, which includes in particular, a turbo-expander 46 and a second blow off valve 33 cooperating with each other, placed in parallel to one another and connected to the delivery conduit 16 of the compressor 10 upstream of the cooling device 30. In detail, the turbo-expander 46 and the second blow off valve 33 are provided with their own suction and delivery conduits 46A, 46B and 33A, 33B, respectively, the suction conduits 46A and 33A and the delivering conduits 46B and 33B being placed downstream of the compressor 10 and upstream of the cooling device 30, respectively.

It should be noted that, in this case, the second blow off valve 33 operates to open or close the delivery conduit 16 and does not operate to laminate the process gas. Therefore, during normal operation of the plant, the process fluid passes through the conduits 33A and 33B, since the second blow off valve 33 is normally open. Vice versa, during the recovery mode, the first blow off valve 21 closes and the second blow off valve 33 closes gradually, when the recirculation has been stabilized, to transfer the flow rate to the turbo-expander 46 in a completely analogous way to that described above with reference to the plant in FIG. 2.

The turbo-expander 36 or 46 can either be of the single stage type or of the multi stage type, based upon per se known constructive configurations. FIG. 4 shows, given purely as an example, a section view of a turbo-expander 36 (or 46) of the single stage type. It is made up of a stator casing 44, on which at least one distribution conduit 44A is formed, suitable for conveying the gas entering from the suction conduit 40 (or 46A) towards an impeller 48.

It can be foreseen for there to be one or more "adjustable inlet guide vanes" 50, as known in the jargon, or IGV and suitable for adjusting the flow rate of gas conveyed towards the impeller 48 in the distribution conduit 44A, fixedly attached to the stator casing 44. In a particularly advantageous embodiment of the invention, the adjustable inlet guide vanes 50 are controlled in a coordinated manner, through suitable electronic control means 35, with respect to the lamination valve 24 or to the second blow off valve 33. The impeller 48 sets a shaft 54 for connection to the generator 38 in rotation, through a transmission group 52. The gas in outlet from the impeller 48 is thus delivered through a divergent conduit 56.

According to another aspect, the invention concerns a gas compression plant comprising the system for recovering energy according to the present invention.

According to a further aspect, the invention concerns a method for recovering energy in a gas compression plant during recirculation mode, the method comprising at least the following steps:

providing for at least the turbo-expander 36 or 46 and the lamination valve 24 or the second blow off valve 33 connected in parallel downstream of the compressor 10;

actuating the lamination valve 24 or the second blow off valve 33 and the turbo-expander 36 or 46 according to the gas flow rate and to the working conditions of the compressor 10.

Moreover, during the recovering mode, the outlet of the plant is closed by the blow off valve 21.

Advantageously, the first blow off valve 21 and the lamination valve 24 or the second blow off valve 33 are activated to avoid that the working conditions P1 of the compressor 10 (FIG. 5) reach the limit work conditions P2 according to parameters which can be preset, as described in more detail hereafter.

In an advantageous embodiment of the invention, the step of actuating the valve 24 or 33 provides for a first sub-step in which it is gradually closed to transfer the head to the turbo-expander 36 or 46. During such a first sub-step it is possible to provide for gradually modifying the inclination of the inlet guide vanes 50 of the turbo-expander 36 or 46 so as to control the gas flow rate.

Advantageously, the aforementioned actuating step provides for an initial sub-step in which the lamination valve 24 is completely opened to allow the gas to pass and to stabilize the recirculation system.

Alternatively, in an initial step, the second blow off valve 33 can normally be opened so as to allow gas to pass through during the normal operation of the plant.

Figure 5:
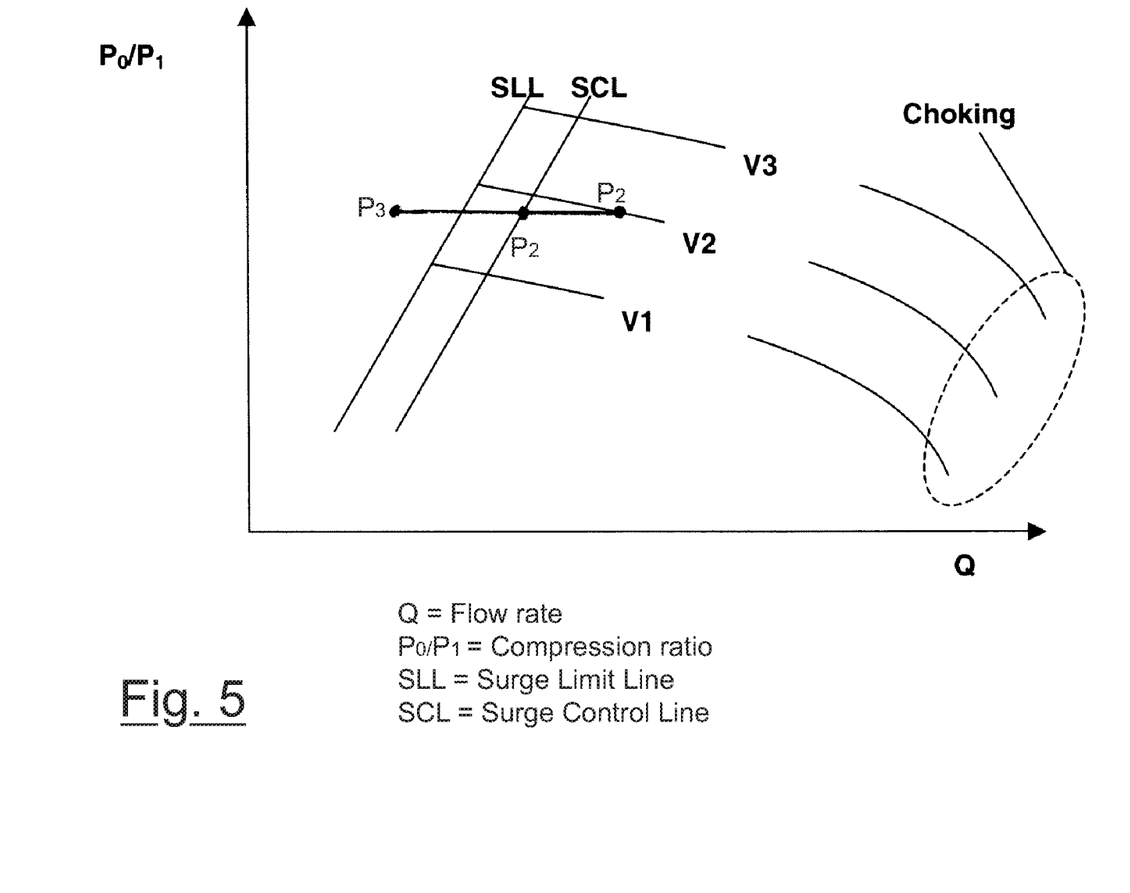
FIG. 5 is a diagram that shows the performance curves for a generic centrifugal compressor that can be installed in a gas compression plant provided with the energy recovery system according to the invention.

FIG. 5 schematically shows a "performance map" of a generic centrifugal compressor in which the flow rate Q is given in the X axis and the compression ratio $P_0/P_1$ in the Y axis, from which the characteristic curves V1, V2 and V3, the surge limit line SLL and the surge control line SCL with constant revs for given conditions of the fluid, are obtained.

It should be noted that beyond the limit line SLL (on the left in FIG. 5) the compressor operates in surge conditions. The working condition P1 of the compressor 10 can thus safely vary up to the working condition P2 arranged on the line SCL, beyond which (on the left in FIG. 5) the compressor 10 does not work safely any longer. Again, beyond the line SLL (point P3), the compressor 10 works in surge conditions and can suffer damage.

Advantageously, the electronic devices 35 continuously detect the working condition P1 of the fluid and activate the recovery system according to the invention, if such conditions get close to the limit curve SCL (point P2), so as to take such a working condition back within safety values thus protecting the compressor 10 and at the same time producing useful energy.

Figure 6:
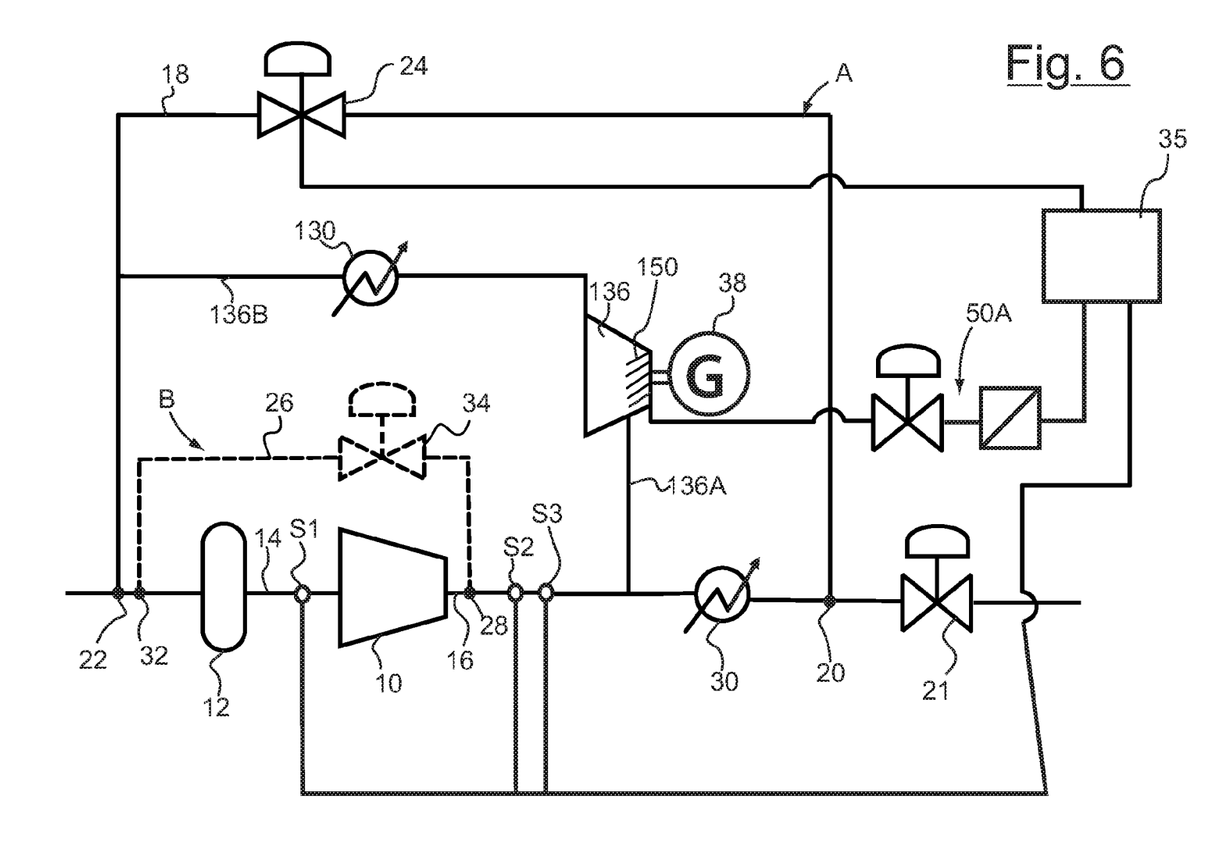
FIG. 6 is a completely schematic view of a gas compression plant provided with a third example embodiment of the energy recovery system according to the invention.

Finally, FIG. 6 shows another embodiment of the invention, in which in the portion of the plant arranged downstream of the compressor 10 and upstream of the cooling device 30 a turbo-expander 136 is installed which is in parallel with respect to the antisurge valve 24.

In particular, the turbo-expander 136 has an inlet conduit 136A, in fluid connection with the delivery conduit 16 between the compressor 10 and the cooling device 30, and an outlet conduit 136B, in fluid connection with the recirculation pipes 18 downstream of the valve 24. In the outlet conduit 136B a further cooling device 130 can be foreseen to cool the fluid. Even in this case the turbo-expander 136 and the valve 24 cooperate with each other and are controlled by the electronic devices 35, which are used for activating them according to the gas flow rate and to the working conditions of the compressor 10.

During the normal operation of the plant, the valve is closed and the recirculation circuit A is inactive. During the recovery step, the first blow off valve 21 downstream of the plant closes the flow in outlet, whereas the valve 24 opens the recirculation system A. As soon as the recirculation has been stabilized, such a valve 24 gradually closes to transfer the gas flow rate to the expander 136. Therefore, in this case, the turbo-expander 136 is actuated by the gas before it is cooled by the cooling device 30.

In particular, even in this case the electronic devices 35 are used for activating the recirculation system A, by opening the valve 24 and closing the valve 21, according to the fluid flow rate variation measured by means of the sensors S1, S2 and S3, arranged in suitable positions on the suction conduit 14 and delivery conduit 16 of the compressor 10.

During the initial step of the recirculation mode, the valve 24 remains open for the time necessary (in general by checking the variations in pressure and flow rate detected with the aforementioned sensors S1, S2 and S3) to stabilize the recirculation of gas according to the operation of the compressor 10. As soon as the recirculation has been stabilized, the valve 24 gradually closes so as to transfer the load to the turbo-expander 136. At the same time, the electronic devices 35 gradually modify the inclination of the adjustable inlet guide vanes 150 of said turbo-expander 136 by means of the hydropneumatic circuit 50A, so as to optimize the flow rate of gas in this device.

Thanks to the recovery system according to the present invention it is possible to recover up to 70% of the energy which would otherwise be lost inside the gas recirculation system of the compression plant. Such energy, consisting of the enthalpy that the gas receives by the compressor 10, is first converted into mechanical energy by the turbo-expander 36, 46 or 136 and then into useful electric energy by the generator 38.

It has thus been seen that the energy recovery system in a gas compression plant according to the present invention achieves the purposes previously highlighted, being particularly effective when coupled with compressors that often operate in gas recirculation mode.

The energy recovery system in a gas compression plant of the present invention thus conceived can, in any case undergo numerous modifications and variants, all covered by the same inventive concept; moreover, all the details can be replaced by technically equivalent elements. In practice, the materials used, as well as the shapes and sizes, can be any according to the technical requirements.

The scope of protection of the invention is thus defined by the attached claims.

What is claimed is:

1. A method for recovering energy in a gas compression plant during recirculation mode, the method comprising:
   providing for at least one turbo-expander and at least one valve connected in parallel in the portion of the plant arranged downstream of at least one compressor, and an electric current generator coupled exclusively to the turbo-expander, wherein the electric current generator is configured to recover energy from a recirculation system connected to the at least one compressor;
   measuring a flow rate of gas and a working condition of said at least one compressor by means of at least one sensor arranged on a suction side of the compressor and at least one sensor arranged on a delivery conduit of the compressor; and
   actuating, by means of an electronic device, said valve and said turbo-expander according to the flow rate of gas and the working conditions measured by the sensors.

2. A method according to claim 1, wherein said valve is actuated to open the recirculation system so as to prevent the working condition of said at least one compressor from reaching, a limit working condition.

3. A method according to claim 1, wherein actuating said valve further comprises gradually closing said valve to gradually transfer the load, towards said turbo-expander.

4. A method according claim 1, wherein actuating said valve and said turbo-expander further comprises gradually modifying the inclination of the inlet guide vanes of said turbo-expander so as to control the flow rate of the gas gradually conveyed therein by said valve.

5. A method according to claim 2, wherein actuating said valve and said turbo-expander further comprises opening a lamination valve to allow the gas to pass in said recirculation system.

* * * * *